(12) United States Patent
Monsorno

(10) Patent No.: US 6,992,879 B2
(45) Date of Patent: Jan. 31, 2006

(54) CAPACITOR WITH BURIED ELECTRODE

(76) Inventor: Richard V. Monsorno, 2201 Corporate Square Blvd., Jacksonville, FL (US) 32216

( * ) Notice: Subject to any disclaimer, the term of this patent is extended or adjusted under 35 U.S.C. 154(b) by 605 days.

(21) Appl. No.: 09/950,223

(22) Filed: Sep. 10, 2001

(65) Prior Publication Data

US 2002/0067588 A1 Jun. 6, 2002

Related U.S. Application Data

(63) Continuation-in-part of application No. 09/596,673, filed on Jun. 19, 2000, now Pat. No. 6,337,791.

(51) Int. Cl.
*H01G 4/228* (2006.01)

(52) U.S. Cl. ............... 361/306.1; 361/306.3; 361/311; 361/313; 361/321.2; 361/321.4; 361/308.1

(58) Field of Classification Search ............ 361/306.1, 361/306.3, 308.1, 321.2, 321.3, 321.5, 309, 361/310–313, 321.4, 303, 307.1
See application file for complete search history.

(56) References Cited

U.S. PATENT DOCUMENTS

| | | | | |
|---|---|---|---|---|
| 5,561,586 A | * | 10/1996 | Tomohiro et al. | |
| 5,576,926 A | * | 11/1996 | Monsorno | |
| 6,154,356 A | * | 11/2000 | Kagata et al. | |
| 6,337,791 B1 | * | 1/2002 | Monsorno | |

* cited by examiner

*Primary Examiner*—Eric W. Thomas
*Assistant Examiner*—Nguyen T. Ha
(74) *Attorney, Agent, or Firm*—Charles E. Baxley

(57) ABSTRACT

A capacitor includes a planar electrode layer which is mounted between a pair of dielectric layers. The electrode layer generally is placed slightly off-center with respect to the dielectric layers so that the electrode layer extends to an end portion of the dielectric layers. One layer of the pair of dielectric layers has a pair of spaced apart contact members, each having a different polarity from the other. The contact members extend onto end portions of the dielectric layers with one of the contact members forming an electrical connection with the electrode layer. The combination of the electrode layer, the dielectric layer on which the contact members are mounted, and the contact member not connected to the electrode layer, allow development of a selected value of capacitance. Providing trimmed contact members as well as controlling their size and spacing allow for convenient preselection of desired operative characteristics of the capacitor. The contact members could be positioned on a substrate to which a buried electrode is mounted.

6 Claims, 5 Drawing Sheets

CAPACITOR WITH BURIED ELECTRODE

CROSS-REFERENCE

The present application is a continuation-in-part of Applicant's U.S. patent application Ser. No. 09/596,673, filed Jun. 19, 2000, now U.S. Pat. No. 6,337,790.

FIELD OF THE INVENTION

This invention relates generally to capacitors and more particularly to a ceramic capacitor which utilizes a buried layer.

BACKGROUND OF THE INVENTION

Prior art relating to solid state capacitors includes such patents as U.S. Pat. No. 4,665,465 to Tanabe and U.S. Pat. No. 5,107,394 to Naito et al. Construction of these capacitors includes multiple electrode layers which are fastened by means of soldering to a mechanical end cap. A soldering process introduces a degree of unreliability as a result of residual stresses formed in the capacitor during its manufacture. Additional unreliability results from stresses which are imposed on a solder joint due to differential rates of thermal expansion and contraction of various components of the capacitor; including its electrodes, its dielectric material, its solder material and its end cap; when the capacitor is exposed to temperature variations and extremes; with or without other stressful influences, during use. Also relevant is U.S. Pat. No. 5,576,926 to the present Applicant.

SUMMARY OF THE INVENTION

It is an object of the present invention to provide a buried layer capacitor that is particularly effective at very high frequencies.

Another object of the invention is to provide a buried layer capacitor which performs with highly reliability.

Another object of the invention is to provide a buried layer capacitor which is capable of highly reliability over a broad range of operating temperatures.

Yet another object of the invention is to provide a buried layer capacitor which can be manufactured in quantity at a low unit cost while maintaining high quality.

The foregoing and other objects and advantages of the invention will appear more clearly hereinafter.

In accordance with the invention, there is provided a buried layer capacitor which includes a planar electrode layer mounted between a pair of dielectric layers. Length and width dimensions of the dielectric layers are somewhat greater than corresponding length and width dimensions of the electrode layer. The electrode layer is placed slightly off-center with respect to the dielectric layers so that the electrode layer extends to an end portion of the dielectric layers. One layer of the pair of dielectric layers has a pair of spaced apart contact members, each having a different polarity from the other. The contact members extend onto the end portions of the dielectric layers with one of the contact members forming an electrical connection with the electrode layer. The contact member design helps facilitate testing of the circuit. The combination of the electrode layer, the dielectric layer on which the contact members are mounted, and the contact member not connected to the electrode layer, allow development of a selected value of capacitance.

In an alternative embodiment of the invention, the pair of spaced apart contact members is replaced by a pair of metallized areas each having a different polarity from the other. The metallized areas facilitate mounting the buried layer capacitor on a circuit board while using minimum surface area of the circuit board.

BRIEF DESCRIPTION OF THE DRAWINGS

Other important objects and advantages of the invention will be apparent from the following detailed description, taken in connection with an accompanying drawings in which.

DETAILED DESCRIPTION

Figure 1:
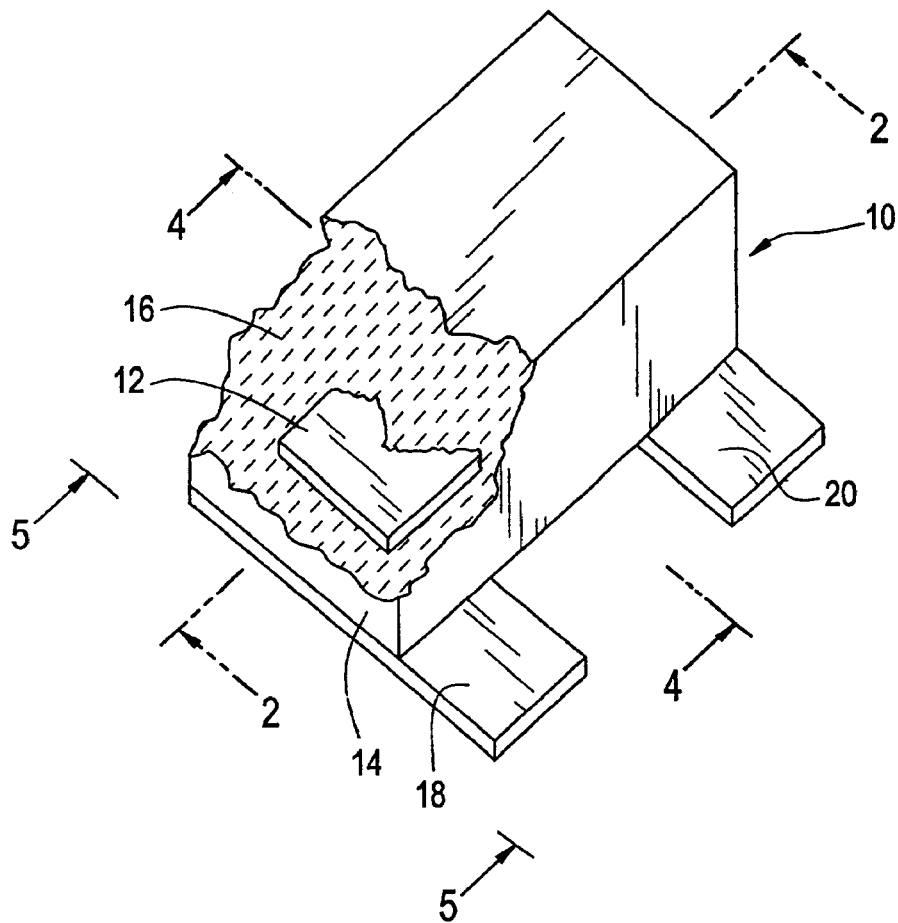
FIG. 1 is a generally downwardly looking perspective view of a buried layer capacitor made in accordance with the present invention and having a portion of the capacitor shown broken away to reveal details of internal construction.

With reference to the drawings, wherein like reference numbers designate like or corresponding parts throughout, there is shown in FIG. 1 a buried layer capacitor generally designated 10, made in accordance with the present invention, which includes an electrode layer 12, a first dielectric layer 14, a second dielectric layer 16 and a pair of contact members 18, 20, each of the contact members having a different polarity from the other.

Figure 3:
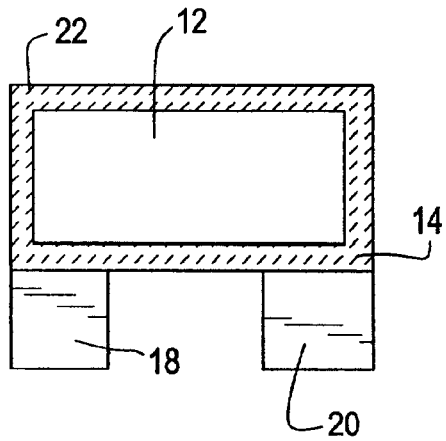
FIG. 3 is a planar cross-sectional view taken along line 3—3 of FIG. 2.
Figure 2:
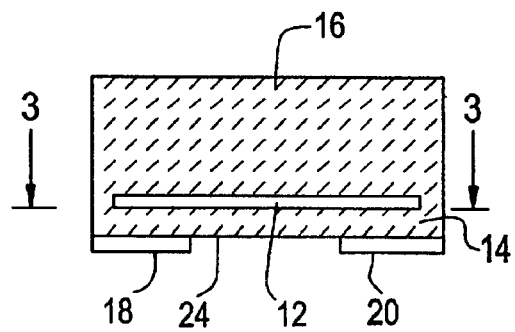
FIG. 2 is an elevational cross-sectional view taken along line 2—2 of FIG. 1.
Figure 4:
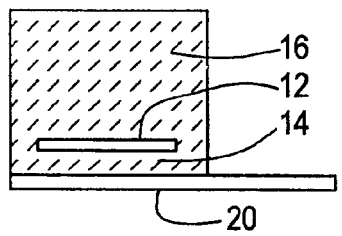
FIG. 4 is an elevational cross-sectional view taken along the line 4—4 of FIG. 1.
Figure 5:
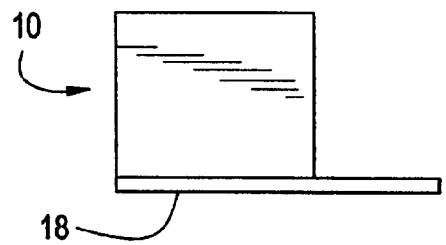
FIG. 5 is a side elevational view taken along the line 5—5 of FIG. 1.

The dielectric layers 14, 16 preferably are rectangular and as is shown in FIGS. 1 and 3, the electrode layer 12 also is generally rectangular, with length and width dimensions which are somewhat smaller than corresponding length and width dimensions of the dielectric layers 14, 16. The electrode layer 12 is planar and generally is centered relative to the dielectric layers 14, 16 resulting in a border, generally designated in FIG. 3 by the reference numeral 22, which surrounds a periphery of the electrode layer 12. The electrode layer 12 thus is completely contained or buried in the dielectric layers 14, 16. The electrode layer may be silver, gold, nickel, copper, palladium or another high conductivity metal.

The contacts members 18, 20 are shown attached to a bottom surface 24 of the dielectric layer 14. The contacts members 18, 20 preferably are each planar and are made of any one of a number of metals which have desirable combination of stiffness and conductivity. Appropriate materials for the contact members are copper and silver.

The dielectric layers 14, 16 are made of any one of a number of dielectric materials such as magnesium titanate, strontium titanate or barium titanate.

As is best seen from FIG. 1, the first dielectric layer 14 is disposed between the electrode layer 12 and the contacts members 18, 20. The contacts members 18, 20 have a preferred thickness which is in the order of 0.01 inches. The dielectric layer 14, in combination with the electrode layer 12 and the contacts members 18, 20, (each having a different polarity from the other) allow development of capacitance between the contacts members 18, 20.

The buried layer capacitor 10 of FIGS. 1–5 typically has the following dimensions which should be considered as given by way of illustration only and should not be considered as limiting in any way. Overall length of the capacitor 10 is in an order of 0.05 inches, its width is in an order of 0.05 inches, its height is in an order of 0.02 inches. Thickness of the dielectric layer 14 is in an order of 0.003 inches and thickness of the dielectric layer 16 is in an order of 0.017 inches.

The thickness of the dielectric layer 14 typically may range from 0.0005 inches to 0.01 inches in order to vary capacitance and the voltage rating of the capacitor 10.

The dimensions of the electrode layer 12 are typically as follows: length 0.045 inches, width 0.045 inches, and thickness 0.0001 inches.

Figure 6:
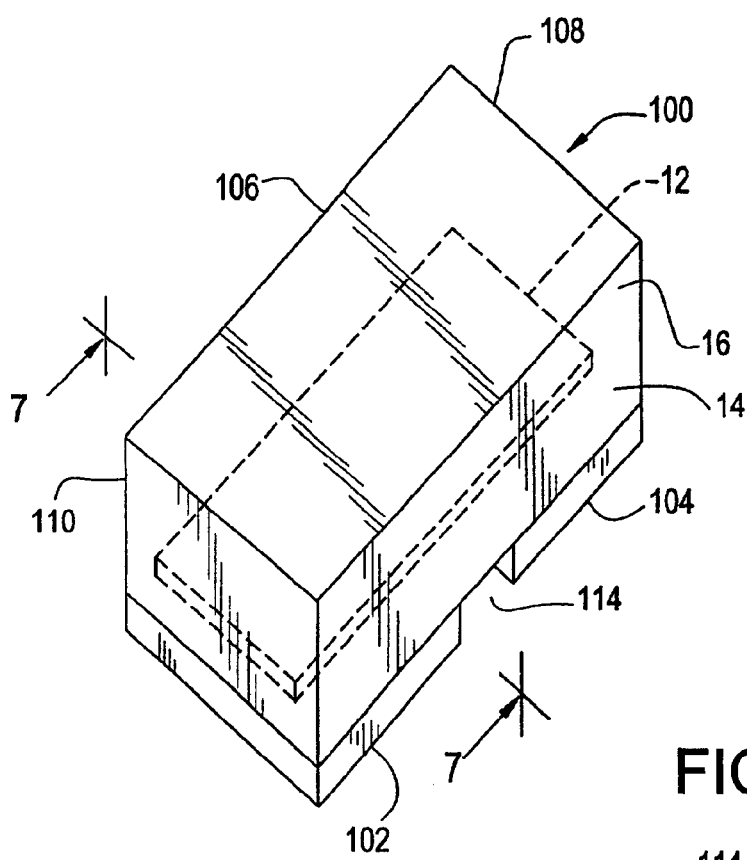
FIG. 6 is a generally downwardly looking perspective view of an alternative embodiment of the buried layer capacitor of FIG. 1.
Figure 7:
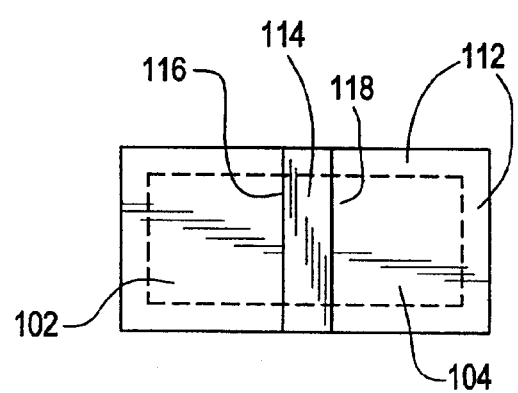
FIG. 7 is a bottom planar view of the capacitor of FIG. 6 taken along the line 7—7 of FIG. 6.
Figure 8:
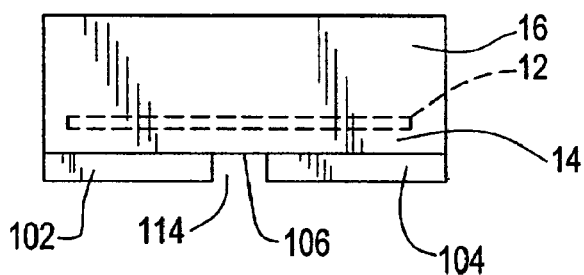
FIG. 8 is a side elevational view of the capacitor of FIG. 6.
Figure 9:
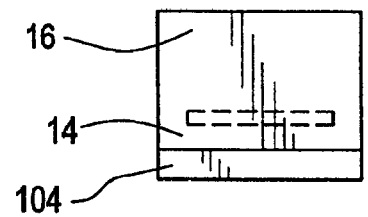
FIG. 9 is an end elevational view of the capacitor of FIG. 6.

An alternative embodiment of a capacitor generally designated 100 according to the invention is shown in FIGS. 6–9. In the capacitor embodiment 100, the contact members 18, 20 are replaced by a pair of metallized areas 102, 104 on a bottom surface 106 of the capacitor as shown in FIG. 8. The metallized areas 102, 104 function as terminations, each having a different polarity from the other, and facilitate mounting of the capacitor 100 directly to a printed circuit board. Elimination of the contacts members 18, 20 results in use of a minimum amount of circuit board area for the capacitor 100.

The capacitor 100 includes a first dielectric layer 14 and a second dielectric layer 16 and an electrode layer 12, each of which is generally similar to corresponding parts which have been described in connection with the embodiment depicted in FIGS. 1–5.

The capacitor 100 typically includes an electrode layer 12 made of palladium and metallized areas 102, 104 or terminals made of silver.

The following physical dimensions and capacitance values for the buried layer capacitor 100 should be considered as given by way of example and should not be considered as limiting in any way. The length dimension (as measured along edge 106) may range from 0.040 inches to 0.50 inches; the width (as measured along edge 108) may range from 0.020 inches to 0.50 inches; and the thickness (as measured along edge 110) may range from 0.010 to 0.10 inches.

Most typically, the capacitor 100 is manufactured in the following sizes:

TABLE 1

Typical Capacitor Sizes

| SIZE | LENGTH (inches) | WIDTH (inches) | THICKNESS (inches) |
|---|---|---|---|
| A | 0.060 | 0.050 | 0.030 |
| B | 0.120 | 0.100 | 0.080 |

The margin or barrier at the sides and at the ends of the electrode layer 12 as indicated by the reference numeral 112 in FIG. 7 may range from 0.005 inches to 0.010 inches. The gap between the terminations 102, 104 as indicated by the reference numeral 114 in FIGS. 6, 7 and 8 may range from 0.005 inches to 0.020 inches. The thickness of the dielectric layer 14 between the electrode layer 12 and the terminations 102, 104 may range from less than 0.001 inches to 0.010 inches.

Figure 15:
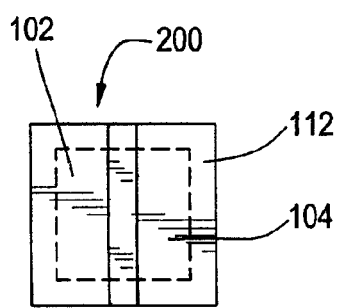
FIG. 15 is a bottom planar view of another embodiment of the buried layer capacitor of FIG. 1, similar to FIG. 7 and incorporating a square configuration.
Figure 16:
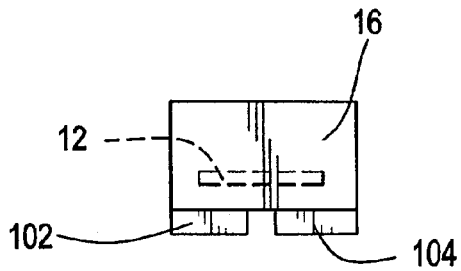
FIG. 16 is an end elevational view of the capacitor of FIG. 15.

In another alternative configuration generally designated 200 shown in FIG. 15, the length and width dimensions are made equal, thereby resulting in a the square configuration of the buried layer capacitor 200.

Typical values for capacitance for a buried layer capacitor 100 having a size designated as Size A in Table 1 for various values of dielectric thickness, margin size, gap spacing and dielectric constant are shown in Table 2. The capacitance values shown are in pico Farads (pF) as measured between terminations 102, 104.

TABLE 2

Capacitance Values for Buried Layer Capacitors

| DIELECTRIC THICKNESS | MARGIN | GAP | DIELECTRIC CONSTANT | | | | |
|---|---|---|---|---|---|---|---|
| (inches) | (inches) | (inches) | K = 13 | K = 23 | K = 65 | K = 90 | K = 4000 |
| 0.001 | 0.005 | 0.010 | 1.1 pF | 2.3 pF | 5.7 pF | 7.8 pF | 351 pF |
| 0.010 | 0.005 | 0.010 | 0.1 pF | 0.4 pF | | | |
| 0.001 | 0.010 | 0.010 | 0.4 pF | | | | |

An important feature of the buried layer capacitor 100 is the ability to adjust or trim the value of capacitance in an efficient manner. The capacitance of the buried layer capacitor 100 can be adjusted by adjusting the gap 114 between the terminations 102, 104 each having a different polarity from the other. Such adjustment may be performed as a final part of a manufacturing process and eliminates need for contacting and trimming the electrode layer 12. This adjustment may be accomplished by trimming or cutting away a small portion of the terminations along the edges 116, 118 using conventional abrasion cutting or laser cutting equipment.

Figure 10:
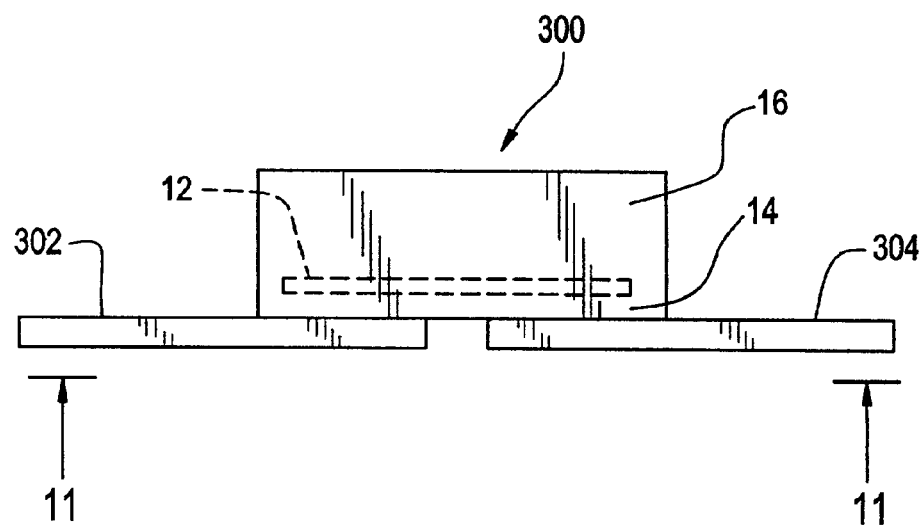
FIG. 10 is a side elevational view of an alternative embodiment of the buried layer capacitor of FIG. 1, incorporating a pair of axial leads.
Figure 11:
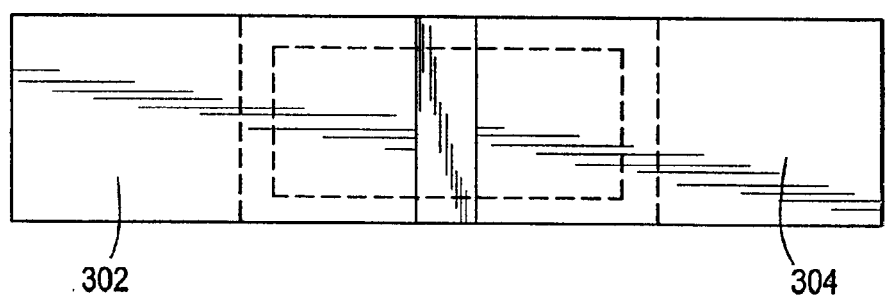
FIG. 11 is a bottom planar view of the capacitor of FIG. 10, taken along line 11—11 of FIG. 10.

FIGS. 10 and 11 show an alternative embodiment of the buried layer capacitor contacts members 300 which incorporates axial contact members 302, 304. The axial contacts members 302, 304 provide an alternative mounting configuration.

Figure 12:
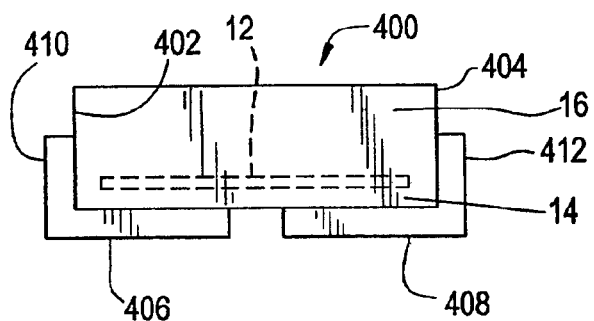
FIG. 12 is a side elevational view of another embodiment of the buried layer capacitor of FIG. 1, incorporating metallized portions, each having a different polarity from the other, on the end surfaces of the dielectric layers.
Figure 13:
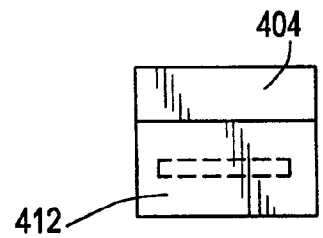
FIG. 13 is an end elevational view of the capacitor of FIG. 12.
Figure 14:
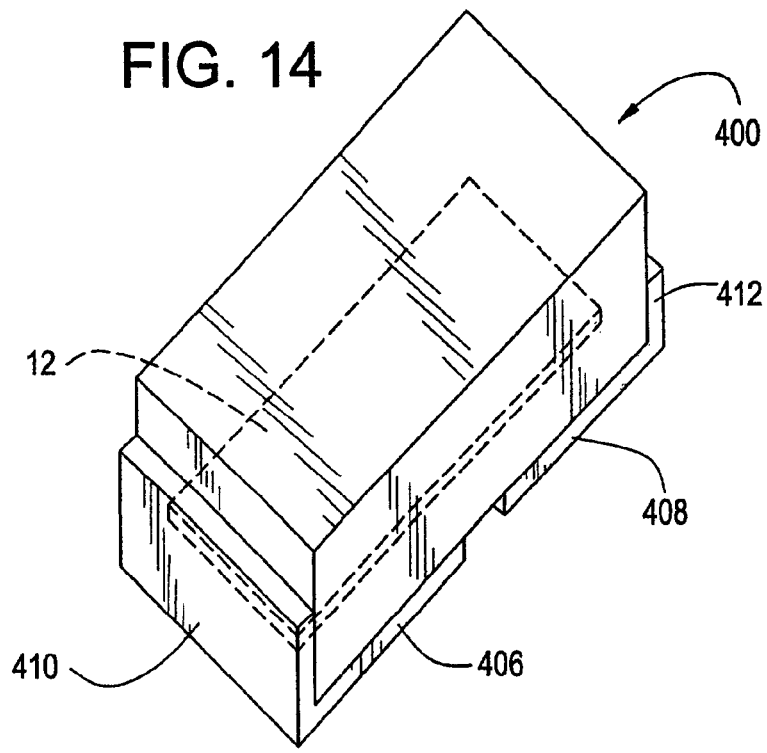
FIG. 14 is a perspective view of the capacitor of FIG. 12.

FIGS. 12–14 show another alternate embodiment of the buried layer capacitor generally designated 400 in which the metallized areas 102, 104 or cathode and anode shown in FIG. 6 have been modified to extend onto the end surfaces 402, 404 of the dielectric layers 14, 16. The terminations 406, 408 on the buried layer capacitor 400 facilitate use of test equipment in which probes are placed on surfaces 410, 412 in order to measure performance characteristics of the capacitor 400.

Figure 17:
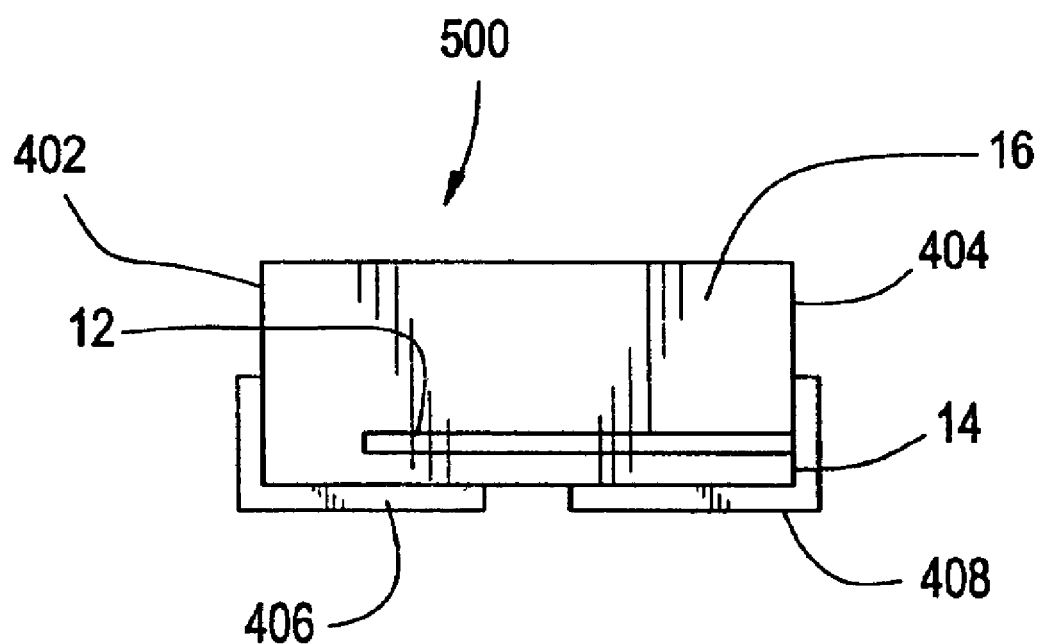
FIG. 17 is a cross-sectional view of an exemplary capacitor.

FIG. 17 shows an exemplary embodiment of the buried layer capacitor generally designated 500 in which the electrode layer 12 is extended through dielectric layers 14, 16 to electrically connect to the termination 408. This connection shorts the capacitor defined by the electrode layer 12, the dielectric layer 14, and the termination 408. Prior to the shorting, that capacitor was in a series connection with the capacitor defined by the electrode layer 12, the dielectric layer 14, and the termination 406. If a first capacitor is defined with a capacitance of C1 and a second capacitor is defined with a capacitance of C2 and the first and second capacitors are in a series connection, the equivalent capacitance is equal to C1 times C2 divided by the sum of C1 plus C2. If C1 equals C2, then the equivalent capacitance is equal to ½ of C1 or C2, because they are of the same value. Thus, shorting one of the two series capacitors, as seen in FIG. 17, has the net effect of doubling the capacitance. The buried layer capacitor 500 functions the same mechanically and electrically as the buried layer capacitors generally designated 10, 100, 200, 300, 400, respectively, albeit with twice the capacitance.

In a preferred embodiment of the buried layer capacitor 500, the terminations 406, 408 extend along end surfaces 402, 404. This arrangement provides additional surface area for bonding and simplifies inspection and connection to the circuit board.

The relatively thicker dielectric layer 16 contributes to overall ruggedness of the buried layer capacitors generally designated 10, 100, 200, 300, 400, 500, respectively thicker dielectric layer 16. This relatively thicker dielectric layer 16 makes it possible to handle these capacitors using conventional production type automatic handling equipment, even though the dielectric layer 14 is in the range of 0.0001 inches to 0.01 inches.

A key feature of the buried layer capacitors generally designate 10, 100, 200, 300, 400, 500, respectively is their performances at very high frequencies. A typical capacitor made according to the prior art is useful up to approximately 11 gigaHertz (11 GHz). Tests performed on capacitors made according to the present invention indicate useful performance to 20 GHz and above.

The foregoing specific embodiments of the present invention as set forth in the specification herein are for illustrative purposes only. Various deviations and modifications may be made within the spirit and scope of this invention, without departing from a main theme thereof.

What is claimed:

1. A buried layer capacitor comprising:
   a first dielectric layer, with said first dielectric layer having a length dimension and a width dimension, and with said first dielectric layer having a first surface and a second surface;
   an electrode layer, with said electrode layer having a length dimension and a width dimension, with said length and width dimensions of said electrode layer smaller than said length and width dimensions respectively of said first dielectric layer, and with said electrode layer mounted on said first surface of said first dielectric layer,
   a second dielectric layer, with said second dielectric layer having a length dimension and a width dimension and with said length and width dimensions of said second dielectric layer coextensive with said length and width dimensions respectively of said first dielectric layer; and
   two spaced apart, opposite polarity contact member provided on said second surface of said first dielectric layer, each of said contact members extending onto an end surface of said first and said second dielectric layers, and with one of said contacts members connecting to an end surface of said electrode layer.

2. A buried layer capacitor according to claim 1, in wherein said electrode layer is rectangular.

3. A buried layer capacitor according to claim 1, in which said first and said second dielectric layers are each rectangular.

4. A buried layer capacitor according to claim 1, in which each of said contact members projects beyond said width dimension of said first dielectric layer.

5. A buried layer capacitor according to claim 1, in which said electrode layer is square.

6. A buried layer capacitor according to claim 1, in which said first and said second dielectric layers are each square.

* * * * *